US012165792B2

(12) United States Patent
Poterala

(10) Patent No.: US 12,165,792 B2
(45) Date of Patent: Dec. 10, 2024

(54) ARRESTER ASSEMBLY PROVIDING ENHANCED PROTECTION AGAINST SHORT CIRCUITS AND FIRE RISK

(71) Applicant: Hubbell Incorporated, Shelton, CT (US)

(72) Inventor: Stephen Franklin Poterala, Aiken, SC (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 17/722,866

(22) Filed: Apr. 18, 2022

(65) Prior Publication Data

US 2022/0336125 A1 Oct. 20, 2022

Related U.S. Application Data

(60) Provisional application No. 63/233,419, filed on Aug. 16, 2021, provisional application No. 63/176,684, filed on Apr. 19, 2021.

(51) Int. Cl.
*H02H 1/00* (2006.01)
*H01C 7/12* (2006.01)
*H02H 1/04* (2006.01)
*H02H 3/22* (2006.01)
*H02H 9/06* (2006.01)

(52) U.S. Cl.
CPC .................................... *H01C 7/12* (2013.01)

(58) Field of Classification Search
CPC ........................................................ H01C 7/12
USPC ........................................................ 361/117
See application file for complete search history.

(56) References Cited

U.S. PATENT DOCUMENTS

| | | | | |
|---|---|---|---|---|
| 3,973,172 | A * | 8/1976 | Yost | H01T 4/18 361/127 |
| 4,335,417 | A | 6/1982 | Sakshaug et al. | |
| 5,237,482 | A * | 8/1993 | Osterhout | H01T 1/14 361/127 |
| 5,594,613 | A * | 1/1997 | Woodworth | H01C 8/04 361/126 |
| 5,923,518 | A | 7/1999 | Hensley | |
| 6,392,861 | B1 | 5/2002 | Trinh et al. | |
| 9,088,153 | B2 * | 7/2015 | Huo | H05K 13/00 |
| 2005/0088795 | A1 * | 4/2005 | Lenk | H01T 1/14 361/118 |

(Continued)

OTHER PUBLICATIONS

PCT/US2022/025422 International Search Report and Written Opinion dated Aug. 2, 2022 (7 pages).

*Primary Examiner* — Jared Fureman
*Assistant Examiner* — Lucy M Thomas
(74) *Attorney, Agent, or Firm* — Michael Best & Friedrich LLP

(57) ABSTRACT

An arrester assembly including a first terminal electrically connected to an energized conductor and a second terminal electrically connected to a ground conductor. The arrester assembly further includes a plurality of arrester modules electrically connected in series between the first terminal and the second terminal and a disconnect device electrically connected in series with the plurality of arrester modules between the first terminal and the second terminal. Components of the arrester assembly are coordinated to disconnect or isolate failed surge arresters without creating a short circuit condition.

18 Claims, 8 Drawing Sheets

(56) References Cited

U.S. PATENT DOCUMENTS

| | | | | |
|---|---|---|---|---|
| 2019/0066888 | A1 | 2/2019 | Kester | |
| 2021/0193355 | A1* | 6/2021 | van Besouw | H01C 7/12 |

* cited by examiner

TABLE 1

| | Example 1 | | Example 2 | |
|---|---|---|---|---|
| | kV RMS | kV crest | kV RMS | kV crest |
| System L-L (nominal) | 12.00 | 16.97 | 20.78 | 29.38 |
| System L-L (maximum) | 12.60 | 17.82 | 21.82 | 30.85 |
| System L-G (nominal) | 6.93 | 9.80 | 12.00 | 16.96 |
| System L-G (maximum) | 7.27 | 10.29 | 12.60 | 17.81 |
| Arrester LCOV | 6.58 | 9.31 | 11.40 | 16.12 |
| Arrester MCOV | 7.27 | 10.29 | 12.60 | 17.81 |
| Module Vref | 6.02 | 8.52 | 5.22 | 7.38 |
| Arrester Vref | 12.05 | 17.04 | 15.65 | 22.13 |
| Arrester Vres (10kA) | - | 29.30 | - | 38.06 |
| Number of modules | 2 | | 3 | |
| Protective level (Vres/MCOV) | 2.85 | | 2.14 | |

*Fig. 3*

ARRESTER ASSEMBLY PROVIDING ENHANCED PROTECTION AGAINST SHORT CIRCUITS AND FIRE RISK

RELATED APPLICATIONS

This application claims the benefit of U.S. Provisional Patent Application No. 63/176,684, filed Apr. 19, 2021, and U.S. Provisional Patent Application No. 63/233,419, filed Aug. 16, 2021, the entire contents of which are hereby incorporated by reference.

FIELD

Embodiments relate to surge arrester assemblies.

SUMMARY

Arresters, such as surge arresters, are used to protect power systems and components against power surges caused by lightning, electrical switching events, or other electrical events. During a surge event, a drop in resistance of the metal oxide varistor (MOV) discs included in the arrester allows for the arrester to conduct surge current to ground, which prevents the voltage level of a power system from increasing to a level that is dangerous to equipment included in the power system.

While surge arresters are highly capable of protecting equipment against short duration power surges caused by lightning or electrical switching, surge arresters may be overloaded in some situations and fail in an energetic fashion, resulting in a short circuit condition accompanied by severe power arcing, and occasionally, expulsion of hot debris into the environment. Surge arrester failures may be categorized into three failure categories: thermal runaway, impulse duty failures, and flashover/flashunder events. Thermal runaway failures may occur due to temporary overvoltage (TOV) conditions or due to degradation of the MOV discs within the surge arrester (often via moisture ingress). Impulse duty failures occur within the MOV discs during a lightning or switching surge and may be related to defects within the MOV discs, residual damage from prior impulses, or overload of the MOV discs during excessively severe or repetitive duty. Flashover or flashunder failures result from degraded insulation resistance of the arrester housing or internal dielectric components, respectively, and may occur during normal operation, TOV, or impulse duty. These types of failures are hazardous to the nearby environment and create a fire risk when combustible material is located in the vicinity of the arrester. Two of these categories of failure (impulse duty failures and flashover/flashunder failures) may occur near-instantaneously, offering little or no opportunity to anticipate the occurrence of a failure.

Conventional arrester designs are operated in association with disconnect devices that are incapable of mitigating the fire risk caused by one or more categories of arrester failures, and thus provide either no fire protection or incomplete fire protection. That is, a conventional surge arrester may fail more rapidly than a disconnect device can operate, and will fail to a short-circuit condition, thereby allowing external arcing or expulsion of hot debris from the failed arrester into the environment.

A first aspect provides an arrester assembly including a first terminal electrically connected to an energized conductor, a first arrester module electrically connected to the first terminal, the first arrester module including a first metal oxide varistor (MOV) disc, and a second arrester module electrically connected in series with the first arrester module, the second surge arrester module including a second MOV disc. The arrester assembly further includes a disconnect device electrically connected in series with the first arrester module and the second arrester module, and a second terminal electrically connected to the disconnect device, the second terminal electrically connected to a ground conductor.

A second aspect provides an arrester assembly including a first terminal electrically connected to an energized conductor, a disconnect device electrically connected to the first terminal, and a first arrester module electrically connected in series with the disconnect device, the first arrester module including a first metal oxide varistor (MOV) disc. The arrester assembly further includes a second arrester module electrically connected in series with the first arrester module and the disconnector device, the second arrester module including a second MOV disc, and a second terminal electrically connected to the second arrester module, the second terminal electrically connected to a ground conductor.

A third aspect provides an arrester assembly including a first terminal electrically connected to an energized conductor and a second terminal electrically connected to a ground conductor. The arrester assembly further includes a plurality of arrester modules electrically connected in series between the first terminal and the second terminal. The arrester assembly further includes a disconnect device electrically connected in series with the plurality of arrester modules between the first terminal and the second terminal.

In some aspects, the disconnect device may be connected in any position electrically in series with the plurality of arrester modules. That is, the disconnect device may be connected on the energized side or the ground side of a sequence of arrester modules in series, or it may be connected between any two arrester modules within the sequence. As described above, the arrester assembly is designed to fail in a manner that allows the disconnect device to operate before a short circuit condition is created.

Other aspects of the invention will become apparent by consideration of the detailed description and accompanying drawings.

BRIEF DESCRIPTION OF THE DRAWINGS

FIG. 3 illustrates a table including design parameters associated with the arrester assemblies of FIGS. 1 and 2 according to some embodiments.

DETAILED DESCRIPTION

Figure 1:
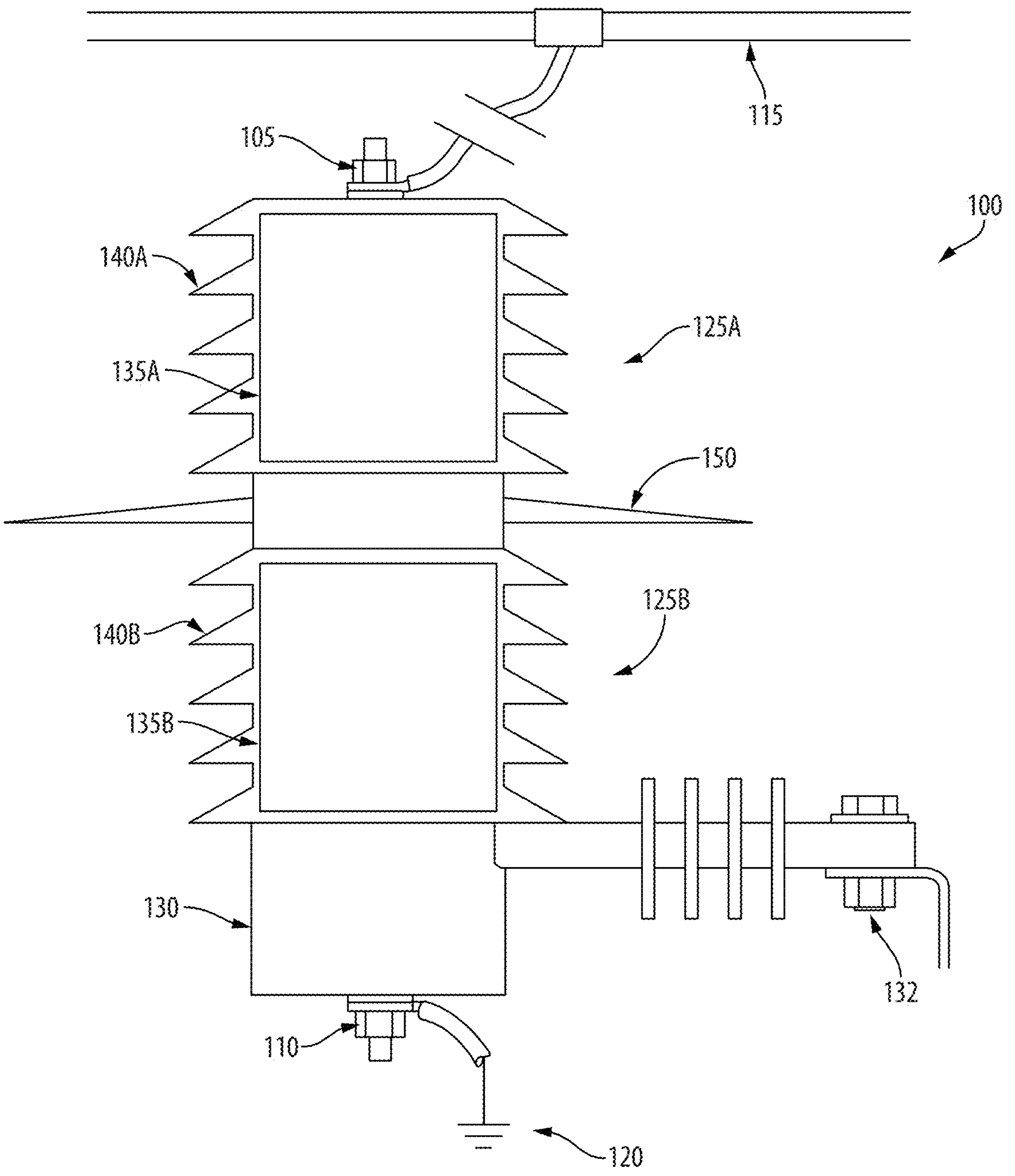
FIG. 1 illustrates a schematic diagram of an arrester assembly according to some embodiments.

Before any embodiments of the application are explained in detail, it is to be understood that the application is not limited in its application to the details of construction and the arrangement of components set forth in the following description or illustrated in the following drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

Functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not explicitly listed.

FIG. 1 illustrates an arrester assembly, such as a surge arrester assembly, 100 according to some embodiments of the application. The surge arrester assembly 100 includes a first, or line side, terminal 105 and a second, or ground, terminal 110. The line side terminal 105 electrically connects the surge arrester assembly 100 to an energized conductor 115 included in a power system. The ground terminal 110 electrically connects the surge arrester assembly 100 to a ground conductor, or system ground 120, included in the power system. The power system may be, for example, an electrical grid system.

The surge arrester assembly 100 further includes a plurality of discrete surge arrester modules 125A-125N and a disconnector device 130. The plurality of surge arrester modules 125A-125N and the disconnect device 130 are electrically connected in series with each other between the line side terminal 105 and the ground terminal 110. In response to the occurrence of a trigger condition, the disconnect device 130 is configured to disconnect the line side terminal 105 from the ground terminal 110.

In some embodiments, the disconnect device 130 is implemented as an isolator disconnector that is configured to detonate an explosive material, such as gunpowder, in response to the occurrence of a trigger condition. In such embodiments, detonation of the explosive material included in disconnect device 130 results in a physical separation of the line side terminal 105 from the ground terminal 110, and thus, an electrical separation between the energized conductor 115 and the ground conductor 120. As shown in FIG. 1, the disconnect device 130 may be supported by a mounting structure, such as a bracket 132 coupled to a distribution pole included in the power system 100. In some embodiments, the disconnect device 130 further utilizes design features that limit fire risk, such as structures to capture or contain debris resulting from detonation of an explosive material. In some embodiments, the disconnect device 130 is implemented as another type of disconnector device.

Figure 2:
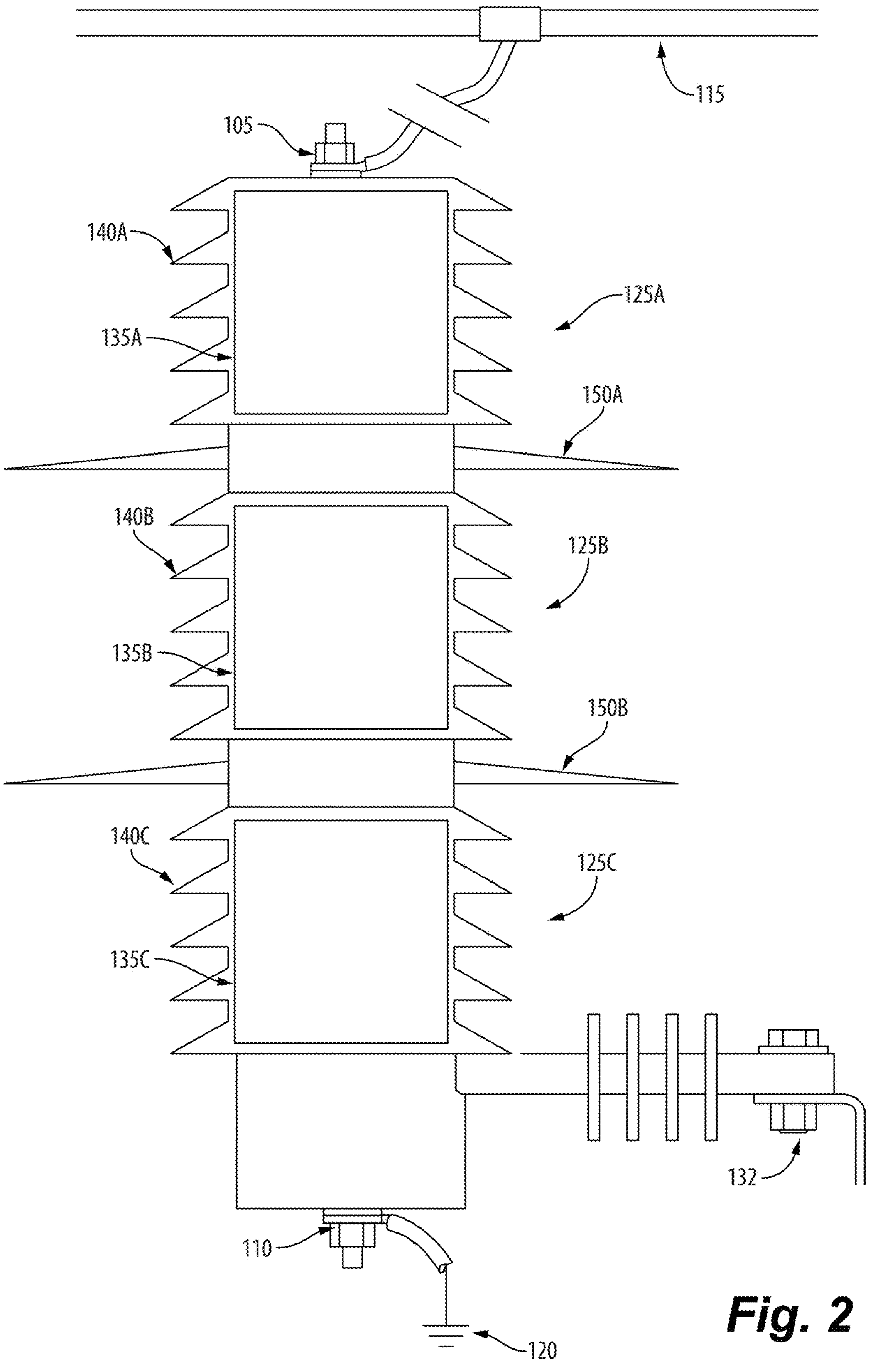
FIG. 2 illustrates a schematic diagram of an arrester assembly according to some embodiments.

As further shown in FIG. 1, at least two discrete surge arrester modules, 125A and 125B, are included in the surge arrester assembly 100. However, the surge arrester assembly 100 may include any desired number, N, of surge arrester modules 125A-125N. For example, FIG. 2 illustrates an embodiment of surge arrester assembly 100 that includes three surge arrester modules 125A-125C electrically connected in series with one another. In other embodiments, the surge arrester assembly 100 includes more than three surge arrester modules, such as four, five, six, or more arrester modules. Each surge arrester module 125 includes a metal oxide varistor (MOV) disc, or stack 135, and a housing 140. For example, the first surge arrester module 125A includes a first MOV stack 135A that is contained within a first housing 140A. Similarly, the second surge arrester module 125B includes a second MOV stack 135B that is contained within a first housing 140B. Each MOV stack 135 includes one or more MOV discs. The module housings 140 may be, for example, made of any suitable material, such as, but not limited to, ceramic, silicone rubber, EPDM rubber, or polymer composite materials.

The electrical characteristics of each component included in the surge arrester assembly 100 are chosen such that there is coordination between the power system line to ground voltage (e.g., the voltage difference between the energized conductor 115 and the system ground 120), the plurality of surge arrester modules 125A-125N, and the trigger condition for operating the disconnect device 130. When compared to conventional arrester designs that do not include a plurality of surge arrester modules, the coordinated operation of components of the surge arrester assembly 100 provides for an improved fire risk mitigation. For example, when an individual surge arrester module 125 of the surge arrester assembly 100 fails (e.g., fails to short circuit), the compartmentalized design of the components included in surge arrester assembly 100 prevents a conductive path within the failed surge arrester module 125 from propagating the entire length of the surge arrester 100. Thus, failure of a first surge arrester module 125A does not immediately result in failure of a second surge arrester module 125B. After failure of the first surge arrester module 125A, the surviving, or non-failed, surge arrester module 125B is operated in coordination with the system line to ground voltage to produce a desired trigger condition (e.g., a voltage condition, a temperature condition, and/or an overcurrent condition) for operating the disconnect device 130. In response to occurrence of the desired trigger condition, the disconnect device 130 operates by physically and electrically isolating the line side terminal 105 from the ground side terminal 110 by breaking continuity of the electrical circuit. Accordingly, the disconnect device 130 operates before the surviving, or non-failed, surge arrester module 125B is overloaded thereby preventing hazardous current arcing associated with completion of a short circuit between the energized conductor 115 and system ground 120.

After failure of one surge arrester module 125 in an arrester assembly, the voltage, current, and/or temperature applied to the disconnect device 130 will be governed by the nonlinear electrical characteristics of the remaining arrester modules 125. In some embodiments, the trigger condition for operation of the disconnect device 130 will occur at a lower threshold of voltage, current, or temperature than used for conventional disconnect devices, which may operate after an arrester has short circuited or when short circuit failure is imminent (e.g. during thermal runaway). For example, in one embodiment the disconnect device operates at a low leakage current such as 20 mA, or 10 mA, or 5 mA. In such an embodiment, the arrester modules 125A-125N are configured such that an arrester failure is contained within a single module 125, and the remaining modules 125 have sufficient TOV capability to sustain the line to ground voltage without thermal runaway. The disconnect device 130 detects the module failure and operates to isolate the failed arrester 100.

In other embodiments, the disconnect device 130 operates at higher leakage currents, such as 100 mA or 500 mA, which correspond to thermal runaway of the failed arrester 100. In this embodiment, existing disconnect devices may be utilized with minimal modification. However, in such an embodiment, the disconnect device 130 operates in a novel manner by virtue of coordination with the arrester modules 125, such that the disconnect device 130 operates after an arrester failure occurs. Accordingly, failure is successfully contained within a single arrester module by compartmentalization of the design.

In some embodiments, the disconnect device 130 contains an electrical circuit, comprising a spark gap in parallel with a gap grading circuit (typically comprised of resistors and capacitors). The gap grading circuit may be used to generate heat (via current passing through the circuit) for triggering an explosive cartridge. During surge events, the grading circuit is bypassed by sparkover of the gap, allowing the surge arrester 100 to function without triggering the disconnect device 130. The grading circuit in these embodiments may utilize novel materials or component configurations to achieve sensitivity to a desired trigger condition of current, voltage, or temperature. For example, the grading circuit may include nonlinear resistive or capacitive components to regulate voltage sharing between the arrester module(s) 125 and the disconnect device 130.

The use of nonlinear materials enables sensitivity to a trigger condition to be tuned such that the disconnect device 130 operates successfully over a wide tolerance of line to ground voltages. For example, the disconnect device 130 operates while accommodating a +/−5% (or more) tolerance in line to ground voltage to accommodate typical industry tolerances on line voltages. Application of this voltage tolerance to an arrester assembly 100 in which one arrester module 125 has failed may result in a very large variation in leakage current due to extreme nonlinearity of the MOV stack 135 in the remaining arrester modules 125. In some instances, inclusion of a linear gap grading circuit (e.g. a linear resistor or capacitor, or combinations thereof) in the disconnect device 130 is inadequate, as the disconnect device 130 may be incapable of reliably operating over such a wide range of leakage current. Some embodiments of the invention therefore utilize a disconnect device 130 with a graded spark gap, in which the gap grading circuit includes nonlinear or highly nonlinear electrical components. For example, the grading circuit may comprise or include a nonlinear material wherein the nonlinearity constant α is defined as:

$$\alpha = \frac{\log I_2 - I_1}{\log V_2 - V_1}$$

where $I_1$ is the current at voltage $V_1$, and $I_2$ is the current at voltage $V_2$. In the case of a nonlinear resistor, the currents $I_1$ and $I_2$ are in phase with the voltage, and in the case of a nonlinear capacitor, they are approximately 90° out of phase. In some embodiments, the nonlinearity coefficient α is in the range of 3-10. In some embodiments, the nonlinear grading element includes a ceramic material consisting of 85-99% zinc oxide and 1-15% additives to achieve the desired nonlinear behavior. In some embodiments, grading element is a resistor, a capacitor, and/or a ceramic material having any combination of resistive and capacitive behavior (meaning the phase angle between voltage and current may take any value between 0-90°).

In some embodiments, coordination of the components included in surge arrester assembly 100 includes selecting the electrical characteristics of each of the plurality of surge arrester modules 125A-125N to be approximately equivalent. That is, each of the plurality of surge arrester modules 125A-125N included in the surge arrester assembly 100 have a similar nonlinear voltage-current response and are approximately equal in performance. When the power system in which surge arrester assembly 100 is included operates in a normal, or non-faulted, state, the respective potential drops across each of the plurality of surge arrester modules 125A-125N are equivalent. However, as described above, when one of the surge arrester modules 125 fails, the surviving, or non-faulted, surge arrester module(s) 125 and disconnect device 130 operate in a coordinated fashion such that the failed surge arrester assembly 100 is safely isolated from the power system.

As also described above, the disconnect device 130 is configured to operate by disconnecting the line side terminal 105 from the ground terminal 110 in response to the occurrence of a trigger condition. The trigger condition is a condition of the disconnect device 130 associated with a failure of one or more of the surge arrester modules 125A-125N included in the surge arrester assembly 100. Failure of a surge arrester module 125 may result in a specific voltage range, current, and/or temperature within the disconnect device 130 that triggers the disconnect device 130 to electrically and physically separate the electrical circuit between the line side terminal 105 and the ground terminal 110. For example, failure of a surge arrester module 125 results in current flowing through the disconnect device 130 that exceeds a predetermined threshold (e.g., 20 mA). Accordingly, the disconnect device 130 is configured to electrically and physically separate when current flowing through disconnect device 130 exceeds the predetermined threshold.

As another example, for embodiments utilizing two surge arrester modules 125, application of the power system line to ground voltage (e.g., the potential difference between the energized conductor 115 and system ground 120) to a single surge arrester module 125 connected in series with the disconnect device 130 will trigger operation of the disconnect device 130. That is, when one or more of the surge arrester modules 125 connected in series with the disconnect device 130 fails, the voltage drop across the surge arrester module 125 that has not failed would be approximately equal to the power system line to ground voltage. Thus, application of the power system line to ground voltage to a single surge arrester module 125 connected in series with the disconnect device 130 indicates the failure of one surge arrester module 125 connected in series with the disconnect device 130 and thereby triggers the disconnect device 130 to operate. Likewise, in embodiments utilizing N arrester modules 125, application of the power system line to ground voltage across (N−1) arrester modules 125 in series with a disconnect device 130 will trigger operation of the disconnect device. That is, the presence of only (N−1) arrester modules 125 indicates the short circuit failure of one arrester module 125, and thereby triggers operation of the disconnect device 130 by creating a specific condition of voltage, current, or temperature.

For example, with respect to the surge arrester assembly 100 of FIG. 1, the voltage across the first surge arrester module 125A is approximately equal to the voltage across the second surge arrester module 125B when neither surge arrester module has failed and/or there are no faults, such as a temporary over voltage (TOV) condition, present in the power system. In particular, when neither of the first and second surge arrester modules 125A and 125B have failed, the respective voltages across each of the surge arrester modules 125A, 125B are approximately equal to half of the line voltage (e.g., potential difference between the energized conductor 115 and system ground 120), with a small voltage drop occurring across the disconnect device 130. However, when a failure, such as a thermal runway failure caused by a TOV condition, occurs in the first surge arrester module 125A, the resistance of the first MOV stack 135A sharply decreases. The sharp decrease in resistance of the first MOV stack 135A results in a decrease in voltage across the first surge arrester module 125A and an increase in voltage across the second surge arrester module 125B. In particular, failure of the first surge arrester module 125A may cause the voltage drop across the first surge arrester module 125A to reduce to short circuit condition. Furthermore, failure of the first surge arrester module 125A may result in application of nearly the entire power system line to ground voltage (e.g., the potential difference between the energized conductor 115 and ground 120) to the second surge arrester module 125B. Accordingly, operation of the disconnect device 130 is triggered in response to application of the power system line to ground voltage to the second surge arrester module 125B. Thus, the disconnect device 130 operates when the first surge arrester module 125A is shorted and the second surge arrester module 125B is not shorted.

In some embodiments, a lowest continuous operating voltage (LCOV) and a maximum continuous operating voltage (MCOV) are specified for the surge arrester assembly 100. In such embodiments, the disconnect device 130 is configured to operate within a voltage range that includes and surrounds a nominal line to ground voltage of the power system, and after a single arrester module 125 has failed to short circuit condition. Specification of both an LCOV and an MCOV is a departure from conventional surge arrester designs that do not include this type of coordination between a plurality of surge arrester modules and a disconnect device, as typically only an MCOV is specified for conventional surge arrester designs. In some embodiments, only an MCOV is specified for the surge arrester assembly 100.

FIG. 3 illustrates exemplary design parameters for surge arrester assemblies that include two surge arrester modules and three surge arrester modules, respectively. In particular, Example 1 shown in the table of FIG. 3 includes design parameters for an exemplary surge arrester assembly, such as the surge arrester assembly 100 illustrated in FIG. 1, that includes two surge arrester modules 125A and 125B. As described above, the design parameters of the surge arrester assembly 100 of FIG. 1 are selected such that the disconnect device 130 will operate when placed in series with a single arrester module 125, which occurs when one of the two arrester modules fails to a short circuit condition.

Figure 4:
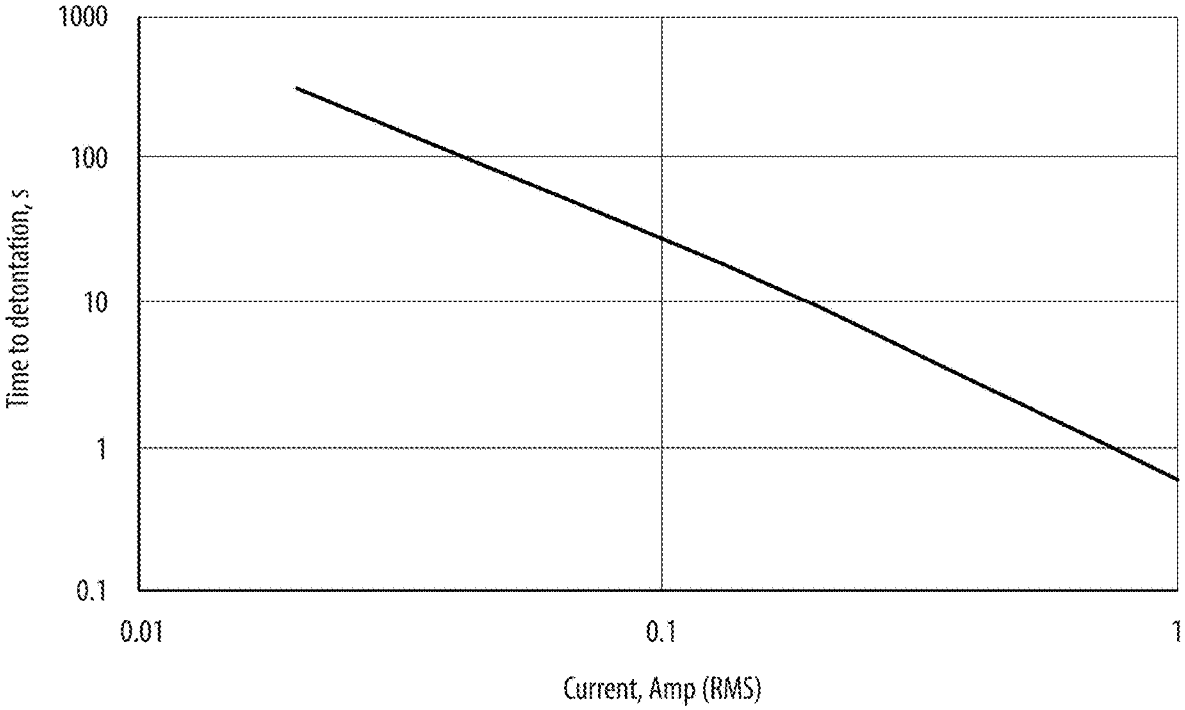
FIG. 4 illustrates the time-current relationship of a disconnect device according to some embodiments.

The disconnect device 130 included in the surge arrester assembly 100 of Example 1 is configured to operate in accordance with the time-current relationship illustrated in FIG. 4. As shown, the disconnect device 130 is configured to separate the line terminal 105 from the ground terminal 110 when an overcurrent between 20 $mA_{ms}$ and 1 $A_{rms}$ flows through disconnect device 130. For example, the disconnect device 130 is configured to operate (via detonation of a cartridge included in the disconnect device) after being exposed to 20 $mA_{ms}$ for approximately 800 seconds. As another example, the disconnect device 130 is configured to operate after being exposed to 1 $A_{rms}$ of current for 1 second.

Figure 5:
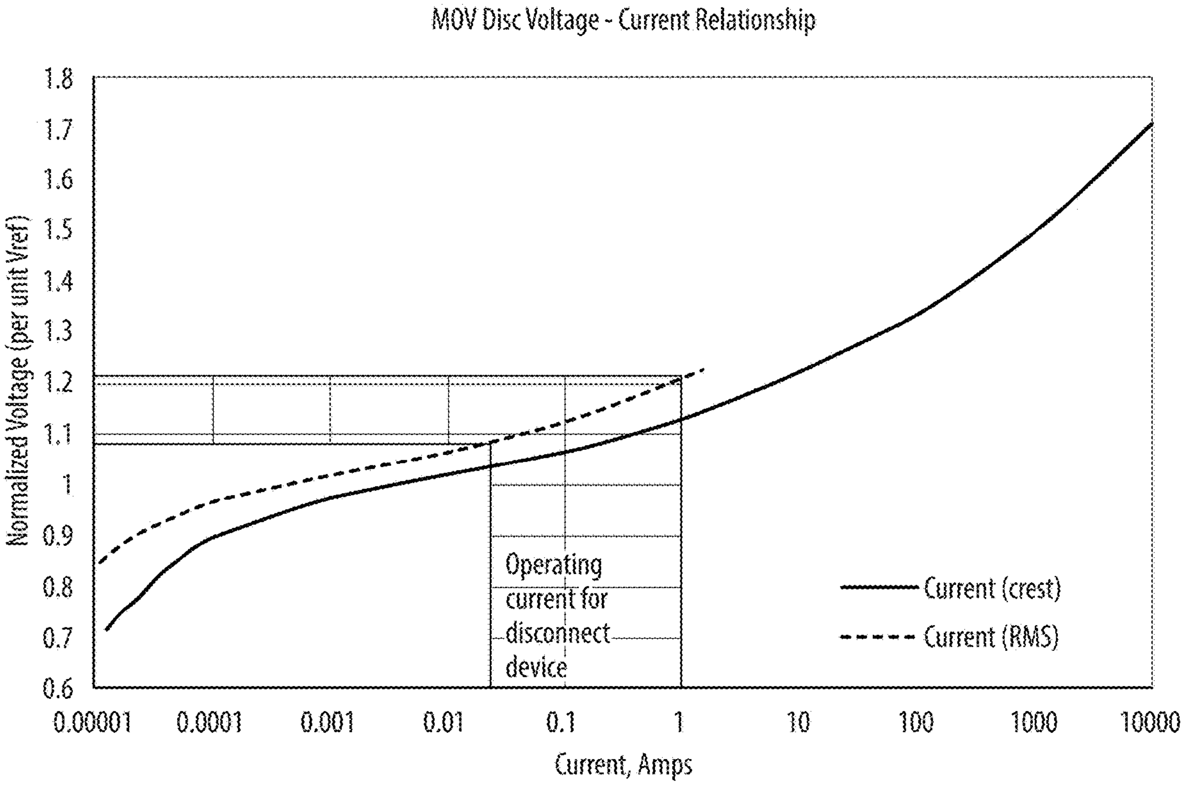
FIG. 5 illustrates the voltage-current relationship of an MOV disc according to some embodiments.

FIG. 5 illustrates an exemplary non-linear voltage-current behavior of the surge arrester modules 125A and 125B included in the surge arrester assembly 100 of Example 1. As shown, each of the individual arrester modules 125A and 125B has a respective reference voltage value ($V_{ref}$) of 8.52 $kV_c$. This particular reference voltage value corresponds to the sum of reference voltage values of each of the discs included in a respective MOV stack 130. That is, the reference voltage value of surge arrester module 125A is representative of the sum of respective reference voltage values of each disc included in the first MOV stack 135A. Similarly, the reference voltage value of surge arrester module 125B is representative of the sum of respective reference voltage values of each disc included in the second MOV stack 135B.

Under normal operating conditions of the surge arrester assembly 100 of Example 1, the voltage across each of the first surge arrester module 125A and the second surge arrester module 125B is approximately equal to half of the voltage across the surge arrester assembly 100. For example, if the voltage value across surge arrester assembly 100 is approximately 12.05 $V_{rms}$ under normal operating conditions, the respective voltage across each of the first surge arrester module 125A and the second surge arrester module 125B is approximately equal to 6.02 $V_{rms}$. A voltage value of 6.02 $V_{rms}$ across an individual surge arrester module 125 corresponds to a normalized voltage value of approximately 0.5-0.6 per unit $V_{ref}$, as illustrated in the voltage-current relationship of FIG. 5. When compared to conventional arrester designs in which the MOV discs are configured to operate continuously between 0.75-0.85 per unit $V_{ref}$, operation of the surge arrester modules 125A and 125B at 0.5-0.6 per unit $V_{ref}$ is much lower. Accordingly, the TOV capability of the surge arrester assembly 100 of Example 1 may commonly exceed the maximum phase to phase system voltage of 12.6 $kV_{rms}$ and is sufficient for mitigating risks of arrester failure due to excessive TOV duty in service.

Example 2 shown in the table of FIG. 3 includes design parameters for an exemplary surge arrester assembly, such as the surge arrester assembly 100 illustrated in FIG. 2, that includes three surge arrester modules 125A-125C electrically connected in series with the disconnect device 130. The surge arrester modules 125A-125C of Example 2 are designed such that the disconnect device 130 is triggered to operate when one of the surge arrester modules 125 fails to short circuit conditions and the two non-faulted surge arrester modules 125 are energized at the line to ground voltage of the power system. For example, if the first surge arrester module 125A fails such that the series connected circuit including the second surge arrester module 125B, the third surge arrester module 125C, and the disconnect device 130 are energized at the line to ground voltage of the power system, operation of the disconnect device 130 will be triggered.

With reference back to FIG. 1, the first surge arrester module 125A is electrically connected between the line side terminal 105 and the second arrester module 125B. Accordingly, the first and second surge arrester modules 125A, 125B are directly connected in series with one another. The disconnect device 130 is electrically connected between the second surge arrester module 125B and the ground terminal 110. However, it should be understood that operation of the surge arrester assembly 100 is not dependent on the order in which the surge arrester modules 125A, 125B and the disconnector device 130 are electrically connected in series with each other.

Figure 6:
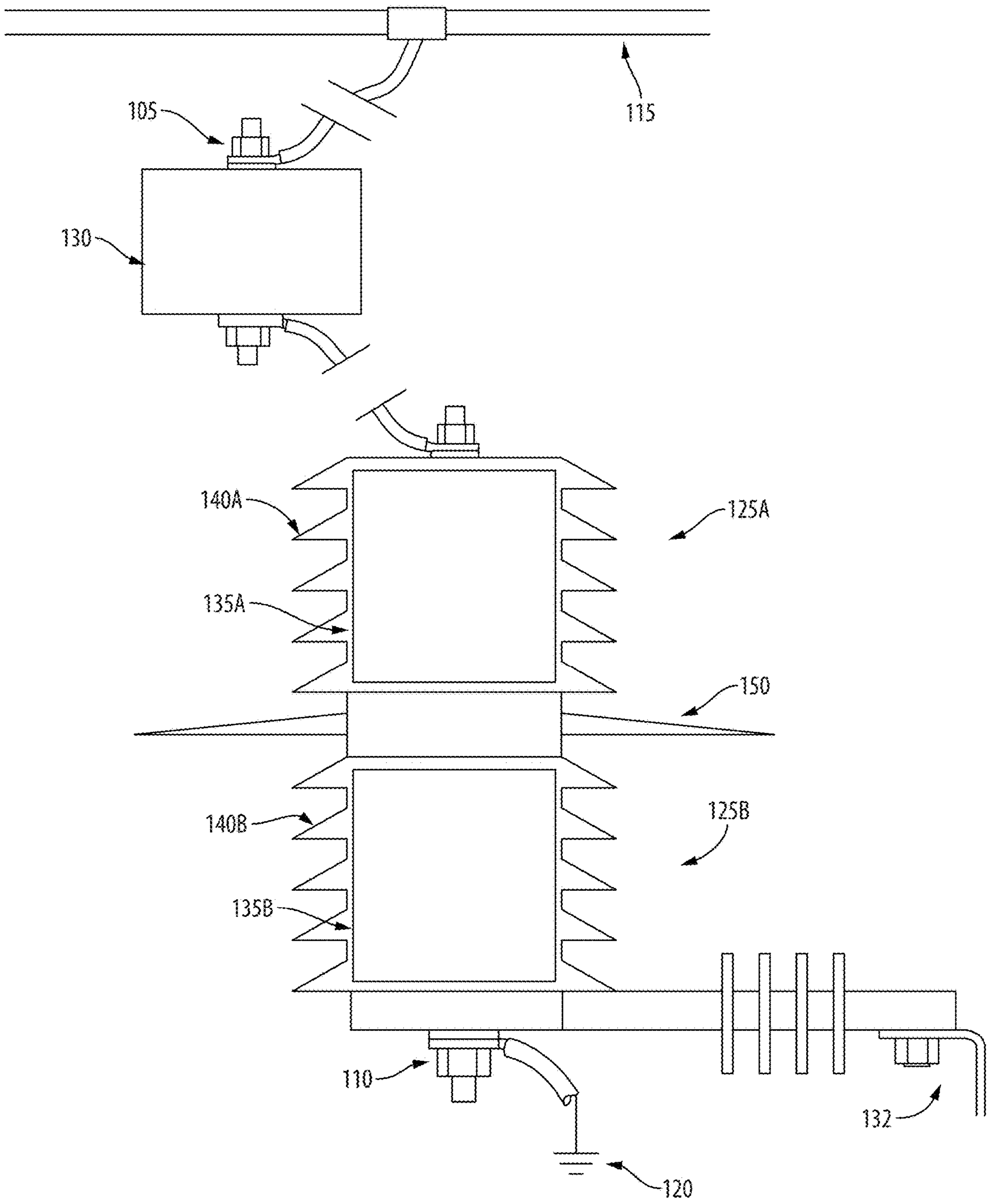
FIG. 6 illustrates a schematic diagram of an arrester assembly according to some embodiments.
Figure 7:
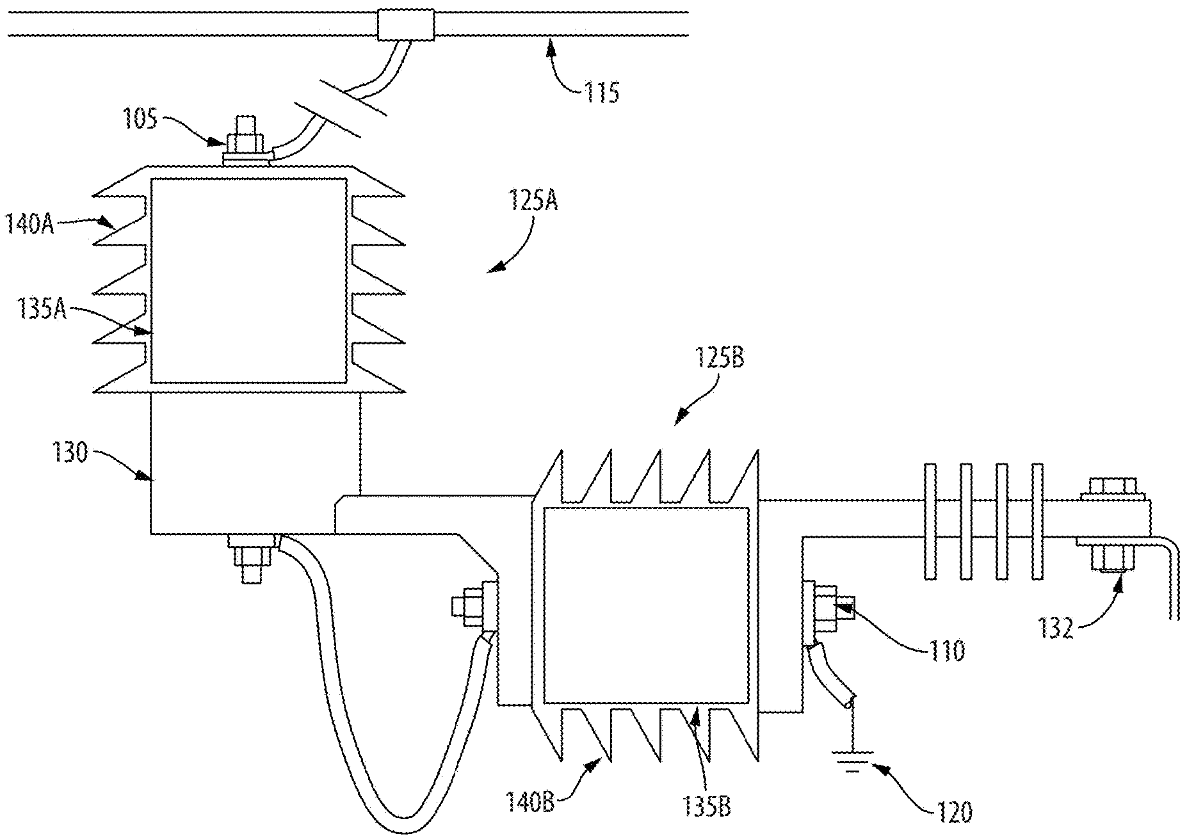
FIG. 7 illustrates a schematic diagram of an arrester assembly according to some embodiments.

For example, FIG. 6 illustrates an embodiment of surge arrester assembly 100 in which the disconnect device 130 is electrically connected between the line side terminal 105 and the first arrester module 125A. As another example, FIG. 7 illustrates an embodiment of surge arrester assembly 100 in which the disconnect device 130 is electrically connected between the first surge arrester module 125A and the second surge arrester module 125B. As shown in FIG. 7, the second surge arrester module 125B is mounted horizontally with respect to the first surge arrester module 125A. It should be understood, however, that the arrangement of components included in the surge arrester assembly 100 is not limited to the embodiments illustrated and described herein. Moreover, in some embodiments, the physical components of the surge arrester assembly 100 are arranged in other ways. For example, one or more of the surge arrester modules 125A-125N and the disconnect device 130 may be physically separate and connected to each other via lead wires. Furthermore, the surge arrester modules 125A-125N may be oriented horizontally, vertically, and/or at an angle relative to the energized conductor 115.

Figure 8:
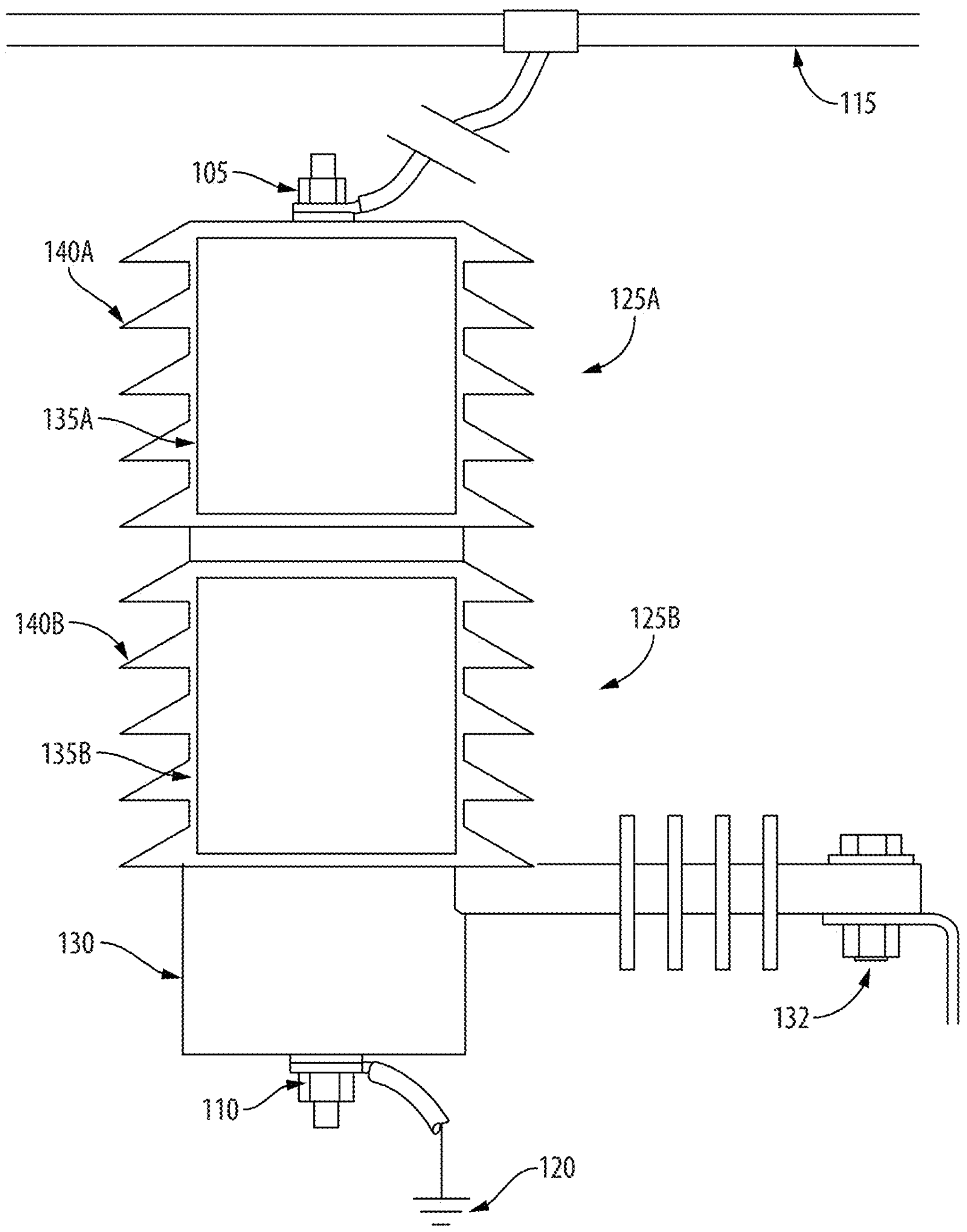
FIG. 8 illustrates a schematic diagram of an arrester assembly according to some embodiments.

In some embodiments in which the first and second surge arrester modules 125A and 125B are directly connected in series with one another, such as the embodiment illustrated in FIG. 1, a conductive arc plate 150 is placed between the two modules. When positioned between the first and second surge arrester modules 125A and 125B, the conductive arc plate 150 is operable to collect or supply leakage current travelling across the exterior housing 140 of either surge arrester module. Thus, any exterior contamination or damage associated with a failed surge arrester 125 is localized to the housing 140 of the failed surge arrester module 125 and does not damage or affect the leakage current across the housings 140 of non-failed surge arrester modules 125. In addition, when the conductive arc plate has a shape that is relatively large in surface area, as shown in FIG. 1, the conductive arc plate 150 is configured to intercept any electrical arcs that arise from a flashover event of one arrester module 125, thereby preventing damage to the second arrester module 125. In some embodiments, there is not a conductive arc plate 150 connected between the first and second surge arrester modules 125A and 125B. For example, FIG. 8 illustrates an embodiment of the surge arrester assembly 100 in which there is no conductive arc plate connected between the first surge arrester module 125A and the second surge arrester module 125B.

Furthermore, the arrester modules 125 are designed such that failures of one module are self-contained and do not damage the remaining healthy arrester module(s) in the arrester assembly 100. In some embodiments, each arrester module 125 is designed in a redundant fashion, such that failure of any arrester module 125 is locally contained. For example, each arrester module 125 uses a separate housing and sealing system, such that a leak from the housing of one arrester module does not cause simultaneous failure the other arrester module(s) 125. Additional design features, such as the arc plate 150, may be utilized to protect each arrester module 125 from failure of other surge arrester modules 125 that are in close physical proximity. In some embodiments, the arrester assembly 100 is designed to have a 10-second TOV capability exceeding the maximum possible line to ground voltage. Accordingly, such embodiments offer additional protection by mitigating the risk of multiple arrester modules 125 failing simultaneously under extreme TOV duty.

What is claimed is:

1. An arrester assembly comprising:

a first terminal electrically connected to an energized conductor;

a first arrester module electrically connected to the first terminal, the first arrester module including a first metal oxide varistor (MOV) disc and a first housing;

a second arrester module electrically connected in series with the first arrester module, the second surge arrester module including a second MOV disc and a second housing;

a conductive arc plate connected between the first arrester module and the second arrester module, wherein the conductive arc plate is configured to collect or supply leakage current travelling across at least one selected from a group consisting of the first housing and the second housing;

a disconnect device electrically connected in series with the first arrester module and the second arrester module, wherein the disconnect device is electrically connected between the first arrester module and the second arrester module;

a gap grading circuit configured to allow function of the arrester assembly during surge events without triggering the disconnect device; and a second terminal electrically connected to the disconnect device, the second terminal electrically connected to a ground conductor.

2. The arrester assembly of claim 1, wherein the disconnect device is configured to disconnect the first terminal from the second terminal when a voltage across the first arrester module exceeds a threshold associated with a voltage between the energized conductor and the ground conductor.

3. The arrester assembly of claim 1, wherein the disconnect device is configured to disconnect the first terminal from the second terminal when a current flowing through the disconnect device exceeds a threshold.

4. The arrester assembly of claim 1, wherein the disconnect device is configured to operate when the first arrester module is shorted.

5. The arrester assembly of claim 4, wherein the disconnect device is further configured to operate when the second arrester module is not shorted.

6. The arrester assembly of claim 1, wherein the disconnect device is configured to operate when a voltage across the first arrester assembly is approximately equal to a voltage between the first terminal and the second terminal.

7. The arrester assembly of claim 1, wherein the second housing is physically separate from the first housing.

8. An arrester assembly comprising:

a first terminal electrically connected to an energized conductor;

a disconnect device electrically connected to the first terminal;

a first arrester module electrically connected in series with the disconnect device, the first arrester module including a first metal oxide varistor (MOV) disc;

a second arrester module electrically connected in series with the first arrester module and the disconnector device, the second arrester module including a second MOV disc;

a conductive arc plate connected between the first arrester module and the second arrester module, wherein the conductive arc plate is configured to collect or supply leakage current;

a gap grading circuit configured to allow function of the arrester assembly during surge events without triggering the disconnect device; and a second terminal electrically connected to the second arrester module, the second terminal electrically connected to a ground conductor;

wherein the disconnect device is electrically connected between first arrester module and the second arrester module.

9. The arrester assembly of claim 8, wherein the disconnect device is configured to disconnect the first terminal from the second terminal when a voltage across the first arrester module exceeds a threshold.

10. The arrester assembly of claim 8, wherein the disconnect device is configured to disconnect the first terminal from the second terminal when a current flowing through the disconnect device exceeds a threshold.

11. The arrester assembly of claim 8, wherein the disconnect device is configured to operate when the first arrester module is shorted.

12. The arrester assembly of claim 11, wherein the disconnect device is further configured to operate when the second arrester module is not shorted.

13. The arrester assembly of claim 8, wherein the disconnect device is configured to operate when a voltage across the first arrester assembly is approximately equal to a voltage between the first terminal and the second terminal.

14. The arrester assembly of claim 8, wherein the first arrester module includes a first housing; and wherein the second arrester module includes a second housing, the second housing being physically separate from the first housing.

15. An arrester assembly comprising:

a first terminal electrically connected to an energized conductor;

a second terminal electrically connected to a ground conductor;

a plurality of arrester modules electrically connected in series between the first terminal and the second terminal;

a conductive arc plate connected between the plurality of arrester modules, wherein the conductive arc plate is configured to collect or supply leakage current; and a disconnect device electrically connected in series with the plurality of arrester modules between the plurality of arrester modules;

a gap grading circuit configured to allow function of the arrester assembly during surge events without triggering the disconnect device.

16. The arrester assembly of claim 15, wherein the plurality of arrester modules includes a first arrester module, a second arrester module, and a third arrester module.

17. The arrester assembly of claim 16, wherein the first arrester module includes a first metal oxide varistor (MOV) disc;

wherein the second arrester module includes a second MOV disc; and wherein the third arrester module includes a third MOV disc.

18. The arrester assembly of claim 15, wherein the disconnect device is configured to disconnect the line terminal from the ground terminal in response to the occurrence of a predetermined trigger condition.

* * * * *